July 3, 1962 W. N. TULLER ETAL 3,042,503
PURIFICATION OF SULFUR
Filed Oct. 9, 1958
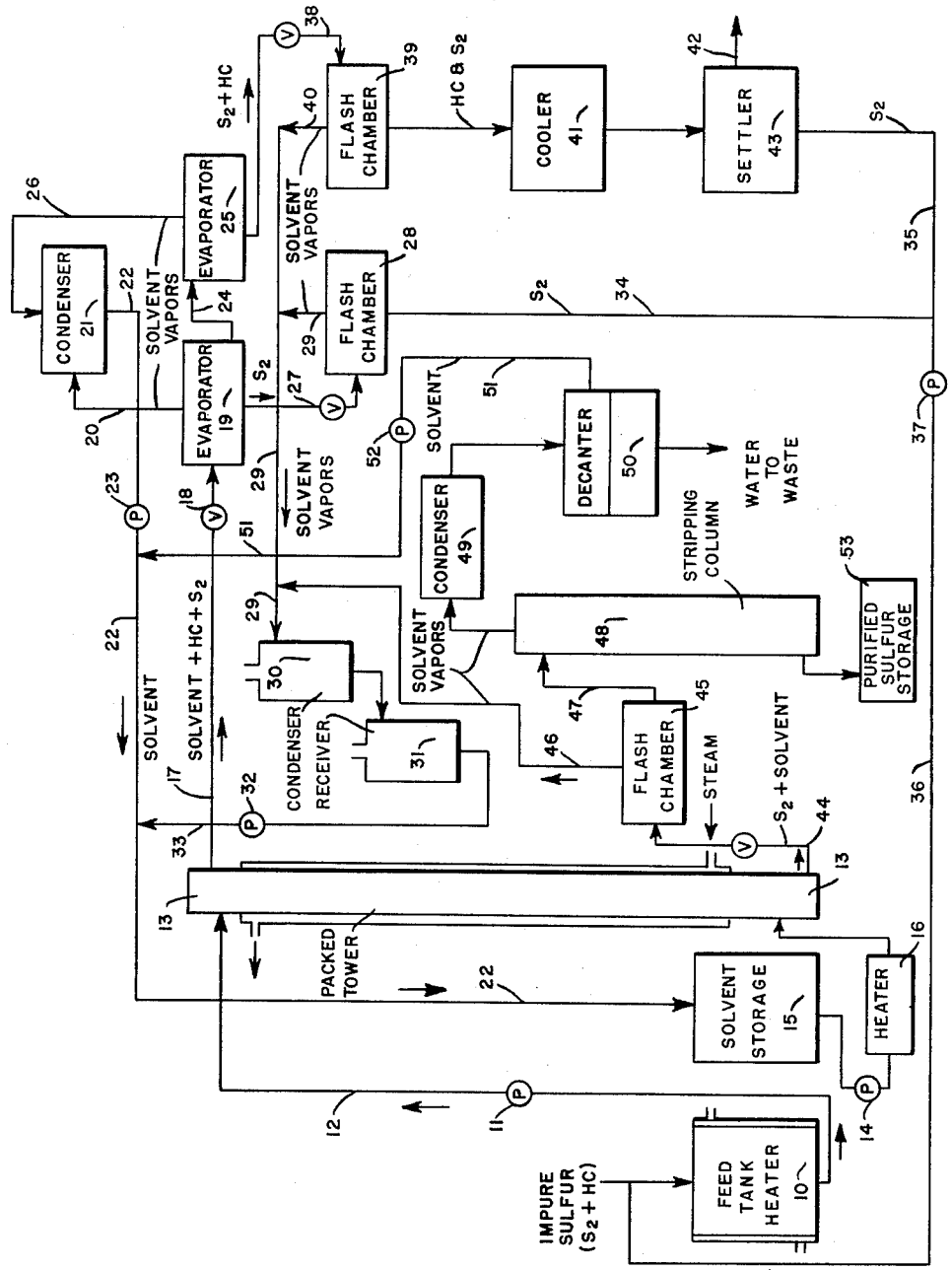
INVENTORS.
WILLIAM N. TULLER
FRANK L. JACKSON
BY 3,042,503
PURIFICATION OF SULFUR
William N. Tuller, White Plains, N.Y., and Frank L. Jackson, Weston, Conn., assignors to Freeport Sulphur Company, New York, N.Y., a corporation of Delaware
Filed Oct. 9, 1958, Ser. No. 766,221
5 Claims. (Cl. 23—310)

This invention relates to the purification of sulfur and more particularly to the removal of carbonaceous or hydrocarbon impurities from crude or mined dark sulfur, specially those sulfurs which contain so much impurity that conventional distillation and adsorption clay methods of purification are too costly.

An object of the present invention is to provide a procedure which is economically acceptable for the removal of carbonaceous impurities from dark sulfurs and the provision of sulfurs of a purity satisfactory for most industrial uses, i.e. those containing less than 0.2% carbon.

Broadly described, the invention may be considered to involve a series of continuous operations including melting the crude or dark sulfur, thereafter flowing the melted sulfur in a readily flowable condition through an extraction zone, flowing a hot liquid solvent for the impurities in countercurrent contact with the flowing sulfur to take up the impurities in the sulfur, collecting the thus purified molten sulfur from one end of the extraction zone and collecting the solvent containing the impurities dissolved therein from its other end.

The solvents found to be effective for accomplishing the purification are any of cycloaliphatic hydrocarbon compounds such as cyclohexane, cyclopentane and methyl cyclohexane; aromatic compounds such as benzene, xylene and toluene; and saturated halogenated aliphatic hydrocarbon compounds such as carbon tetrachloride and ethylene dichloride. Of these classes of solvents the cycloaliphatic and aromatic compounds have, in relation to the halogenated compounds, the advantage of being free of any tendency to become acidic in use. For the most part, the operable solvents have low solubility and miscibility in the liquid sulfur. They are quite stable at operating temperatures, for they do not react with the sulfur and are not easily polymerized or decomposed, and they are not excessively corrosive. The atmospheric boiling points of the most effective solvents are below the ordinary operating temperatures at which the extractions are carried out and when such solvents are employed, the extraction zone must be maintained under pressure to retain the solvent in liquid condition. This property permits the solvent to be separated easily from the sulfur by vaporization.

The amount of solvent used in relation to the sulfur treated is not critical. A solvent to sulfur ratio, by volume, per unit of time of .4 has proven satisfactory. Ratios of 1:1 or 2:1, solvent to sulfur, are operable but use of the higher amount of solvent is generally not justified.

The extraction is preferably carried out in a vertical packed tower, the impure sulfur being introduced near the top and the solvent being introduced near the bottom. The purified sulfur containing a minor amount of residual solvent flows from the bottom of the tower and the solvent containing the impurities together with a minor amount of sulfur flows from the top of the tower. The solvent is preferably recovered by evaporation from the raffinate or purified sulfur and from the hydrocarbon-solvent-sulfur mixture flowing from the top of the tower. The hydrocarbon-sulfur mixture after removal of the solvent from the hydrocarbon-solvent-sulfur mixture can be treated to separate completely the hydrocarbon impurities, but it is economically preferable to effect only a partial purification of the sulfur contained therein and to recycle the same to the extraction tower.

By the steps described above for the treatment of the effluent liquids from the tower, all of the sulfur is purified without loss and the solvent is substantially completely recovered.

In a special embodiment of the invention, the recovery of the solvent from the solvent-hydrocarbon-sulfur mixture leaving the tower is accomplished in two or more evaporators. It has been discovered that although it is relatively easy, using a single evaporator, to separate the solvent from the mixture, it is rather difficult and time consuming to separate the sulfur from the hydrocarbons after the solvent has been separated from the mixture. The high viscosity of the hydrocarbon-sulfur mixture greatly impedes the settling of the sulfur and makes separation of one from the other difficult. It has been found that a multiplicity of evaporators arranged in series can effect a more complete separation of the sulfur from the hydrocarbons in a shorter period of time than can be separated by a single unit. Furthermore the sulfur is obtained in purer form.

As the solvent from the solvent-hydrocarbon-sulfur mixture in the first stage evaporator is vaporized, the concentrations of sulfur and hydrocarbons in the mixture increase and a portion of the dissolved sulfur is precipitated and settled therefrom, suitably from 40 to 80%. Since the hydrocarbons in said mixture are substantially more soluble in the solvent than in the sulfur and since the quantity of solvent in the initial extract is greatly in excess of the quantity necessary to dissolve the hydrocarbons, there is sufficient unvaporized solvent remaining to carry the hydrocarbons to the second stage evaporator. Due to the presence of the solvent in the second stage evaporator, the sulfur settles rapidly from the mixture and can be removed from this stage in a relatively pure state. When several evaporators are employed, portions of dissolved sulfur are recovered from each succeeding unit and sulfur-hydrocarbon-solvent mixtures of decreasing solvent and sulfur content are passed through the units in series. This method of operation separates substantially all of the dissolved sulfur in a relatively short period.

The process of the present invention is particularly applicable to the purification of crude or dark sulfurs which contain not more than about 2% carbonaceous impurities. Substantial amounts of dark sulfur requiring purification for certain uses are now obtained by the conventional mining process based on the Frasch process.

In effecting the extraction process of the present invention, the impure sulfur is melted and treated at a temperature which provides a viscosity below about 95 Saybolt seconds. This degree of fluidity can generally be obtained by maintaining the sulfur during the treatment in the tower at a temperature of from about 217° to 320° F. Surprisingly, the extraction of the impurities from the low viscosity sulfur can be carried out in contact periods measured in seconds or at most in a few minutes. Hence with good contact between the impure sulfur and the solvent, the tower may be relatively short and still accomplish the required degree of purification.

A preferred embodiment of an apparatus for carrying out the process of the invention is illustrated in the diagrammatic drawing.

In connection with the illustrated apparatus, the process of the invention is carried out in the following manner.

Liquid sulfur ordinarily containing about 0.5 to 1.0 percent carbonaceous impurities is pumped from a steam-jacketed feed tank 10 by the force of a pump 11 through a conduit 12 to the top of a packed extraction tower 13. A solvent of the character hereinbefore defined, suitably amounting to about 40% of the weight of the sulfur when the solvent is benzene, is forced by a pump 14 from a storage vessel 15 through a heat exchanger 16 into the lower portion of the extraction tower 13.

The liquid sulfur to be purified introduced near the top of the steam-jacketed tower 13 commingles with the counter-flowing solvent as it gravitates toward the base of said tower.

As the sulfur is treated in the extraction tower, the hydrocarbons and other carbonaceous impurities are extracted by dissolution in the solvent. The sulfur and solvent separate in the tower providing a lighter or upper phase and a heavier or lower phase. The lighter phase comprises a mixture of the impurities (hereinafter generally referred to as hydrocarbons), a minor quantity of dissolved sulfur and a major portion of the solvent. The heavier phase comprises the major portion of the liquid sulfur substantially free of hydrocarbons and a minor portion of the solvent.

The lighter phase hydrocarbon-sulfur-solvent mixture rises to the top of the tower 13 and is passed through a conduit 17, having a flow control valve 18, to a first-stage extract evaporator 19 where a fraction of the solvent (preferably about 50%) is vaporized under pressure by the application of heat.

The solvent vapors from evaporator 19, free of sulfur and contaminating hydrocarbons, are passed through a vapor conduit 20 to an extract solvent condenser 21. The condensate from condenser 21 is then forced through a solvent return line 22 by a pump 23 to the solvent storage vessel 15. The remaining solvent from the lighter phase mixture in evaporator 19 contains substantially all of the hydrocarbons extracted from the sulfur and some dissolved sulfur. This fraction is passed from evaporator 19 through a conduit 24 to a second-stage evaporator 25 where virtually all of the remaining solvent is vaporized. The solvent vapors are then passed through a conduit 26 to the extract solvent condenser 21 where the solvent is condensed to its original fluid state. Here it is combined with the condensate from the first-stage evaporator 19 and returned therewith to the solvent storage vessel 15.

The sulfur precipitated in evaporator 19 (suitably about 74% of the total) containing a small portion of solvent, is passed from the evaporator through valved line 27 to a first-stage atmospheric flash chamber 28 where the entrapped solvent is vaporized. These solvent vapors pass from the top of said chamber through a conduit 29 to an atmospheric condenser 30 from which the condensate flows to a solvent receiver 31. The condensate is forced by a pump 32 through a line 33 to the solvent return line 22 where it is combined with the recovered solvent from the first- and second-stage evaporators 19 and 25 and in which it is returned to the storage vessel 15.

The sulfur from the first-stage flash chamber 28, still in the liquid state but now under atmospheric pressure flows from the bottom of said flash chamber through a line 34, to a line 35, where it is combined with the recovered sulfur flowing therein from the second-stage evaporator 25. This sulfur is then pumped through a sulfur return line 36 by pump 37 to the sulfur feed tank 10 for further treatment.

From the second-stage evaporator 25, the sulfur and hydrocarbon fraction, containing only a small quantity of solvent, flows under pressure through a valved line 38 to the second-stage atmospheric flash chamber 39 where it is flashed to atmospheric pressure. The solvent vaporizes and is passed through lines 40 and 29, respectively, to the atmospheric condenser 30. Here it is condensed and the condensate returned to the head of the system with the recovered solvent from the first-stage atmospheric flash chamber 28. The sulfur and hydrocarbons from flash chamber 39 are passed to a cooler 41, which causes the sulfur to precipitate from the hydrocarbons. The sulfur and hydrocarbon mixture from cooler 41 is flowed to a settler 43 where the hydrocarbons are allowed to separate from the sulfur and are removed through line 42. The sulfur from settler 43 is then recycled to the sulfur feed tank 10 through lines 35 and 36 by means of a pump 37.

The sulfur raffinate is flowed from the bottom of the extraction tower 13 under pressure through a valved line 44 to an atmospheric flash chamber 45, where the entrapped solvent is vaporized. The solvent vapors pass from the top of said chamber 45 through lines 46 and 29 to the atmospheric condenser 30. The condensed vapors are returned with the solvent from the solvent recovery system, to the solvent storage vessel 15. The raffinate from the atmospheric flash chamber 45 is then passed through conduit 47 to the top of a raffinate stripping column 48 where the last traces of solvent are steam stripped therefrom. Solvent and steam are passed from the top of said column 48 to a condenser 49. The condensate from said condenser is then flowed to a decanter 50 where the water and solvent are allowed to separate. The water from decanter 50 is passed to waste and the solvent pumped through a line 51 by a pump 52 to the solvent return line 22 and storage vessel 15.

The stripped sulfur free of solvent and containing less than about 0.2 percent hydrocarbon impurities is passed from the bottom of the stripping column 48 to the product storage vessel 53.

Example 1

Molten dark sulfur containing carbonaceous impurities amounting to 0.41% carbon was introduced into the system illustrated in the drawing and into the extraction tower at the rate of 1.02 pounds per hour. Hot toluene was introduced into the bottom portion of the tower at an equal rate. Within the tower, the sulfur-solvent mixture was maintained at a temperature of 265° F. After separation of the residual solvent from the sulfur leaving the bottom of the tower, a product was obtained containing impurities analyzing only 0.11% carbon.

Example 2

The process was repeated in the manner described in Example 1 employing 1.06 pounds per hour of melted sulfur containing 0.44% carbon and hot cyclohexane in the quantity of 0.97 pound per hour. The sulfur product obtained after removal of the residual solvent contained only 0.14% carbon.

Example 3

The process was repeated in the manner described in Example 1 employing 1.06 pounds per hour of melted sulfur containing 0.44% carbon and hot benzene in the quantity of 1.18 pounds per hour. The sulfur product obtained after removal of the residual solvent contained only 0.11% carbon.

The process of the present invention may also be considered to involve one which comprises flowing liquid sulfur containing hydrocarbon impurities into a separation zone in countercurrent contact with benzene or other cyclic hydrocarbon compound solvent at a temperature above 230° F.–240° F. but below 312° F.–315° F. under such pressure that the benzene will not vaporize, whereby the impurities are extracted from the liquid sulfur by the solvent and whereby a hydrocarbon-sulfur-solvent mixture and a sulfur-solvent mixture are formed, next flowing the three component mixture to a solvent recovery zone wherein the solvent is recovered and also flowing the two component mixture to a solvent recovery zone where the solvent is recovered, and finally recycling the recovered solvent to the separation zone.

It should be understood that the present invention is not limited to the specific details as to procedures, conditions and materials herein disclosed but that it extends to all equivalents which will occur to those skilled in the art upon consideration of the scope of the claims appended hereto.

We claim:

1. A process for purifying crude mined sulfur containing not more than about 2% of carbonaceous impurities which comprises, melting said sulfur, thereafter continuously flowing the melted sulfur at a viscosity below 95 Saybolt seconds through an extraction zone, continuously flowing a hot liquid solvent for said impurities selected from the group consisting of cycloaliphatic hydrocarbon compounds, aromatic hydrocarbon compounds and halogenated aliphatic hydrocarbon compounds in countercurrent contact with said flowing sulfur, thereby taking up the impurities in the solvent, collecting the thus purified molten sulfur from one end of the extraction zone and collecting the solvent containing the impurities dissolved therein from the other end of said extraction zone.

2. A process for removing hydrocarbon impurities from dark sulfur, which dark sulfur contains initially not more than about 2% of hydrocarbon impurities, which comprises, melting said sulfur, thereafter continuously flowing the melted sulfur into the top portion of a packed tower, maintaining the temperature of the sulfur flowing downwardly through the tower at a level of from about 217° to 320° F., continuously introducing a hot liquid solvent for the impurities selected from the group consisting of cycloaliphatic hydrocarbon compounds, aromatic hydrocarbon compounds and halogenated aliphatic hydrocarbon compounds into the bottom portion of said tower, and upwardly therethrough and out at its top portion, collecting the molten sulfur which flows from a bottom portion of said tower, said sulfur being substantially freed of said impurities but containing some solvent, and separating the solvent from the sulfur, thereby providing a sulfur product of increased purity.

3. A process for purifying crude mined sulfur containing not more than about 2% of carbonaceous impurities which comprises, melting said sulfur, thereafter continuously flowing the melted sulfur at a viscosity below 95 Saybolt seconds through an extraction zone, continuously flowing a hot liquid solvent for said impurities selected from the group consisting of cycloaliphatic hydrocarbon compounds, aromatic hydrocarbon compounds and halogenated aliphatic hydrocarbon compounds in countercurrent contact with said flowing sulfur, thereby taking up the impurities in the solvent, recovering residual solvent by distillation from the thus purified molten sulfur flowing from one end of said extraction zone, recovering the solvent by distillation from the solvent-hydrocarbon impurities-residual sulfur mixture flowing from the other end of said extraction zone in a series of at least two evaporation zones, precipitating out and removing part of the sulfur in each of the evaporation zones, removing from the last evaporation zone the remaining sulfur and the hydrocarbon impurities, separating the hydrocarbon impurities from said remaining sulfur and returning the sulfur recovered from the solvent-hydrocarbon impurities-sulfur mixture to the inlet of the extraction zone.

4. A continuous process of purifying sulfur containing hydrocarbon impurities which process comprises flowing liquid sulfur containing said impurities into a separation zone, treating said sulfur in the separation zone by flowing the sulfur at a temperature above 230° F.–240° F. but below 312° F.–315° F. and a cyclic hydrocarbon compound solvent in counter-current contact with one another under such pressure that the solvent will not vaporize, extracting said impurities from the liquid sulfur by said solvent thereby forming a hydrocarbon-sulfur-solvent mixture and a sulfur-solvent mixture, flowing said hydrocarbon-sulfur-solvent mixture to a solvent recovery zone, recovering in said solvent recovery zone solvent from the hydrocarbon-sulfur-solvent mixture, flowing said sulfur-solvent mixture to a solvent recovery zone, recovering solvent in said solvent recovery zone from said sulfur-solvent mixture, and thereafter recycling said recovered solvent to the separation zone.

5. A continuous process of purifying sulfur containing hydrocarbon impurities which process comprises flowing liquid sulfur containing said impurities into a separation zone, treating said sulfur in the separation zone by flowing the sulfur and a benzene solvent at a temperature above 230° F.–240° F. but below 312° F.–315° F. in countercurrent contact with one another under such pressure that the benzene will not vaporize, extracting said impurities from the liquid sulfur by said benzene solvent thereby forming a hydrocarbon-sulfur-benzene-solvent mixture and a sulfur-benzene-solvent mixture, flowing said hydrocarbon-sulfur-benzene-solvent mixture to a solvent recovery zone, recovering in said solvent recovery zone benzene from the hydrocarbon-sulfur-benzene-solvent mixture, flowing said sulfur-benzene-solvent mixture to a solvent recovery zone, recovering benzene in said solvent recovery zone from said sulfur-benzene-solvent mixture, and thereafter recycling said recovered benzene solvent to the separation zone.

References Cited in the file of this patent

UNITED STATES PATENTS

| | | |
|---|---|---|
| 2,040,359 | Clayton et al. | May 12, 1936 |
| 2,234,269 | McDonald | Mar. 11, 1941 |
| 2,316,673 | McDonald | Apr. 13, 1943 |
| 2,809,885 | Ditman et al. | Oct. 15, 1957 |

FOREIGN PATENTS

| | | |
|---|---|---|
| 366,052 | Great Britain | July 25, 1930 |